United States Patent

Hasson et al.

[11] 4,035,683
[45] July 12, 1977

[54] HIGH VOLTAGE ELECTRIC SWITCH WITH TRIGGER ELECTRODES INTEGRAL WITH MAIN DISCHARGE ELECTRODES

[75] Inventors: Victor Haim Hasson; Hubertus Michael von Bergmann, both of Pretoria, Transvaal, South Africa

[73] Assignee: The South African Inventions Development Corporation, Pretoria, Transvaal, South Africa

[21] Appl. No.: 692,084

[22] Filed: June 2, 1976

[30] Foreign Application Priority Data

June 3, 1975 South Africa .............. 75/3564

[51] Int. Cl.² .............. H01J 17/04; H01J 17/20; H01J 17/30
[52] U.S. Cl. .............. 313/184; 313/198; 313/217
[58] Field of Search .......... 313/184, 197, 198, 217

[56] References Cited

U.S. PATENT DOCUMENTS

| 3,207,947 | 9/1965 | Goncz | 313/197 X |
| 3,230,410 | 1/1966 | Hafkemeyer et al. | 313/197 X |
| 3,356,888 | 12/1967 | Germeshausen et al. | 313/198 X |
| 3,366,824 | 1/1968 | Michel | 313/197 |
| 3,710,178 | 1/1973 | Johnson et al. | 313/198 X |

FOREIGN PATENT DOCUMENTS 1,012,728  12/1965  United Kingdom .............. 313/197

*Primary Examiner*—Palmer C. Demeo
*Attorney, Agent, or Firm*—Ladas, Parry, Von Gehr, Goldsmith & Deschamps

[57] ABSTRACT

This invention provides a compact high voltage electric switch having a fast switching time. The switch comprises two spaced-apart main electrodes defining a breakdown gap, in which an insulating gas is present, and a trigger means in close proximity to the gap to provide electrically generated electro-magnetic radiation of high intensity which causes large-scale volume photo-ionization of the gas and thus breakdown of the gap. The trigger means may conveniently be one or more trigger electrodes, with a trigger discharge occurring between the trigger electrode and one of the main electrodes or between two trigger electrodes. In a preferred embodiment, the main electrodes are flat and the trigger means is a surface gap spark plug centrally mounted in one of the main electrodes, with the trigger discharge occurring between the spark plug and the main electrode in which it is mounted.

10 Claims, 2 Drawing Figures

HIGH VOLTAGE ELECTRIC SWITCH WITH TRIGGER ELECTRODES INTEGRAL WITH MAIN DISCHARGE ELECTRODES

FIELD OF THE INVENTION

This invention relates to a high voltage electrical switch and to a method of switching high voltages.

SUMMARY OF THE INVENTION

According to the invention there is provided a high voltage electric switch which includes:

a housing defining a chamber and adapted to contain an electrically insulating gas;

two spaced-apart main electrodes housed within the chamber, and defining between them a breakdown gap;

connecting means for connecting the electrodes in an electrical circuit, and trigger means in close proximity to the gap, the trigger means being adapted to generate electrically electro-magnetic radiation which irradiates a substantial portion of the insulating gas in the breakdown gap, the radiation being of a sufficiently high intensity to cause substantial photo-electric emission of electrons in the gas and thus breakdown of the gas and an electrical discharge between the main electrodes.

Further according to the invention there is provided a method of switching high voltages, which includes generating, in close proximity to a breakdown gap defined between two main discharge electrodes, electro-magnetic radiation which irradiates a substantial portion of an electrically insulating gas in the breakdown gap, the radiation being of a sufficiently high intensity to cause substantial photo-electric emission of electrons in the gas and thus breakdown of the gas and an electrical discharge between the main electrodes.

The electro-magnetic radiation may be of sufficient intensity to generate an electron density of greater than $10^8$ electrons/cm$^3$ in the breakdown gap between the main electrodes.

By "photo-electric emission" is meant the excitation of an atom by electro-magnetic stimulation to emit an electron. The electrons may accordingly be emitted from atoms of gas or from atoms of the housing material or other solid material within the housing.

The electro-magnetic radiation may have sufficient quantum energy to cause photo-electric emission. Accordingly, the radiation may be in the ultra-violet region of the visible spectrum or have a higher frequency than that of ultra-violet light, i.e. greater than $10^{15}$Hz.

The trigger means may be adapted to generate the electro magnetic radiation by means of a fast, low energy electrical trigger discharge. This discharge may be across the surface of a suitable insulating material, for example, a suitable ceramic.

The trigger means may comprise a trigger electrode in close proximity with one of the main electrodes, the trigger discharge being between the trigger electrode and the main electrode, thereby generating the electro-magnetic radiation. Alternatively, two trigger electrodes may be provided, the trigger discharge being between the trigger electrodes.

The switch may be triggered from a trigger source external from the switch, or it may be self-triggered. Each of the trigger electrodes may accordingly be directly electrically connected to the main electrodes the geometry of the electrodes being such that the breakdown voltage of the trigger electrodes is less than that of the main electrodes. By this means, when a voltage of a sufficiently high magnitude is applied to the electrodes, a trigger discharge occurs between the trigger electrodes causing breakdown between the main electrodes.

In order to increase the breakdown voltage of the gap, the insulating gas may have a high dielectric coefficient, and the gas may be pressurized. Additives may be added to the gas to assist in the photo-electric emission of electrons.

In order to minimize the switch-on time of the switch, the main electrodes may be located as close as possible to one another (according to the hold-off voltage required of the switch), to provide a very small breakdown gap. With this arrangement, in order to hinder static breakdown of the gap, the main electrodes may be provided with a uniform surface geometry such that a uniform static electric field is developed. Further, in order to provide for a sufficient current carrying capacity, the main electrodes may have an extended discharge surface. Conveniently, the electrodes may be planar and parallel to one another. An insulating member may further be provided projecting into the breakdown gap, to provide an extended intermediate tracking surface.

The switch may conveniently have one trigger electrode. This trigger electrode may be located adjacent to one of the main electrodes but insulated therefrom. In order to trigger the switch, the main electrodes may be connected to a source of high voltage, and a trigger pulse of the opposite polarity to that of the electrode adjacent to the trigger supplied to the trigger electrode. By this means a trigger discharge occurs between the trigger and the main electrode adjacent to it, generating a high intensity electro-magnetic flux which irradiates the gas in the breakdown gap causing a large-scale photo-electric emission of electrons in the gap resulting in a very fast discharge between the main electrodes.

In one embodiment, having planar main electrodes, the trigger electrode may be a rod mounted perpendicularly in the middle of one of the main electrodes, the tip of the trigger electrode being flush with the immediate surrounding surface of the main electrode. The trigger electrode may be insulated from the main electrode by means of a ceramic insulator surrounding the trigger electrode. The edge of the ceramic insulator may also be flush with the tip of the trigger electrode, to provide a smooth discharge path between the tip of the trigger electrode and the surrounding main electrode. The trigger may be further connected to a triggering source by means of a coaxial screened cable.

To trigger the switch, the main electrodes and the trigger electrode may be connected to a suitable high voltage source, which is below the breakdown voltage of the gap. A low energy pulse of opposite polarity to that of the surrounding main electrode may then be supplied to the trigger electrode. This results in a low energy trigger discharge occurring between the trigger electrode and the surrounding main electrode. The trigger voltage pulse applied to the trigger electrode and the surrounding main electrode may be of a value substantially greater than the breakdown voltage between the trigger electrode and the surrounding main electrode, to cause a very fast trigger discharge.

Inlet and outlet openings may be provided in the housing, through which the insulating gas may be introduced and removed.

The electrodes may be of any suitable electrically conducting material, such as copper, aluminum, stainless steel, carbon, or the like, and the insulating gas may be any suitable gas such as nitrogen, sulphur hexafluoride, or the like, which has a high dielectric constant and is electrically insulating.

Conveniently, an auxiliary low energy switch according to the invention may be utilised to provide the trigger pulse for a high energy switch according to the invention.

A switch according to the invention may be used in any suitable high voltage application. As nano-second switching times may be obtained with the switch, it may conveniently be used to excite lasers.

BRIEF DESCRIPTION OF THE DRAWINGS

The invention will now be described by way of an example, with reference to the accompanying drawings, in which.

DESCRIPTION OF ILLUSTRATIVE EMBODIMENTS

Figure 1:
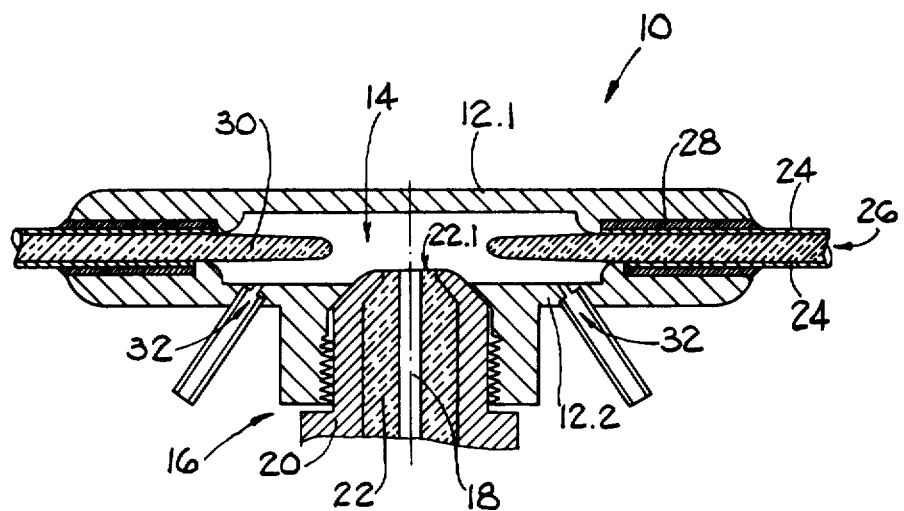
FIG. 1 shows a sectional view of a high voltage externally triggered switch according to the invention.

In FIG. 1, the switch is indicated generally by reference numeral 10. It has two planar circular copper main electrodes 12.1 and 12.2, that are spaced apart to define a breakdown gap 14. A trigger means in the form of a surface gap spark plug 16 is centrally mounted in the main electrode 12.2. The spark plug 16 has a centre trigger electrode 18, mounted in an electrically conducting outer shell 20 but insulated therefrom by a ceramic insulator 22. The tip of the trigger electrode and the trigger discharge surface 22.1 of the ceramic insulator 22 are flush with the tip of the surrounding shell 20. The main electrodes 12.1 and 12.2 are mounted on opposite sides of a piece 26 of conventional circuit board which has copper layers 24 on both sides. A circular aperture is made in the circuit board 26 and the peripheral regions of the main electrodes 12.1 and 12.2 are secured to the edge regions of the copper layers 24 defining the aperture by means of a layer or a suitable solder 28 to form a gas tight housing. The insulating substrate 30 of the printed circuit board 26 is allowed to protrude into the breakdown gap 14, in order to increase the hold-off voltage of the switch by increasing the tracking path. The outer copper layers 24 are conveniently used to connect the electrodes in an electrical circuit between a high voltage source and a load (not shown).

Ports 32 are provided in the main electrode 12.2, by means of which a suitable insulating gas such as nitrogen or sulphur hexafluoride having a high dielectric co-efficient is introduced into or removed from the switch 10.

In operation, any air in the housing is removed and nitrogen with a trace amount of triethylamine is pumped in to a pressure of 10 to 15 atmospheres. The main electrode 12.2 is electrically connected to one pole of a suitable high voltage source and the main electrode 12.1 is connected to the other pole of the source via the load. A low energy pulse is then applied to the trigger electrode 18 to cause a trigger discharge between the trigger electrode 18, and the surrounding shell 20, across the discharge surface 22.1. In order to get a very fast trigger discharge, a trigger pulse having a very fast rise time, of the order of 1 nano-second, and an amplitude substantially greater than the breakdown voltage between the trigger electrode 18 and the main electrode 12.2, is applied across these electrode with the trigger electrode 18 having the same polarity as the other main electrode 12.1. This discharge across the surface 22.1 gives rise to ultra-violet light of a very high intensity, which irradiates the breakdown gap 14. This irradiation causes a large-scale photo-electric emission of electrons from the gas and the trace additive in the gap, as well as from the solid surrounding material providing an electron density of about $10^8$ electrons/cm$^3$. Due to the presence of these electrons, a very fast breakdown occurs between the two main electrodes 12.1 and 12.2.

It has been found, that switches having a gap separation of 2 - 3 millimeters have provided hold-off voltages of up to 45 kilovolts, with a nitrogen gas having a pressure of 10 - 15 atmospheres. Due to the low total energy requirement of the trigger, and the ability of connecting the trigger to a suitable source by means of a co-axial cable, trigger rise times of less than 1 nano-second may be utilised to provide nano-second switching of the switch, with sub-nano-second jitter times. Further, switches having an inductance value of the order of one nano-henry or less, are obtained.

The switch may accordingly conveniently be used for exciting or pulsing lasers. Further, as the switch may be reliably triggered, a plurality of switches may be used to synchronously or sequentially excite a number of lasers.

Figure 2:
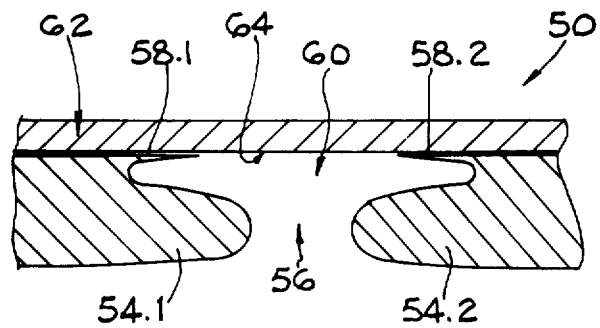
FIG. 2 shows a sectional view of the electrode arrangement for a high-voltage self-triggered switch according to the invention.

Referring to FIG. 2, the electrode arrangement for a self-triggered high-voltage switch is shown generally by reference numeral 50. The arrangement 50 comprises two spaced-apart main electrodes 54.1 and 54.2 defining a main discharge gap 56 and two spaced-apart trigger electrodes 58.1 and 58.2 defining a trigger discharge gap 60. The trigger electrode 58.1 and the main electrode 54.1 are formed from one piece of a suitable metal, such as stainless steel, as with the trigger electrode 58.2 and the main electrode 54.2. The main electrodes 54.1 and 54.2 are closer together than the trigger electrodes 58.1 and 58.2, the main discharge gap 56 being smaller than the trigger discharge gap 60. However, as the main electrode 54.1 and 54.2 are rounded and the trigger electrodes 58.1 and 58.2 are pointed, a highly-stressed electric field is developed by the trigger electrodes 58.1 and 58.2, resulting in the trigger electrodes 58.1 and 58.2 having a lower breakdown voltage than the main electrodes 54.1 and 54.2.

A ceramic insulator 62 is provided adjacent the trigger electrodes 58.1 and 58.2 to provide a surface 64 across which the trigger discharge occurs. The electrodes are housed in a housing having openings through which a suitable insulating gas may be introduced and removed. For the sake of clarity, details of the housing are not shown.

In operation, a high voltage pulse is applied across the electrodes. As the trigger electrodes 58.1 and 58.2 have a lower breakdown voltage, a trigger discharge first occurs across the ceramic surface 64. This generates ultra-violet light of high intensity which irradiates the insulating gas in the main discharge gap 56. This results in photo-electric emission of electrons in the main discharge gap 56 having a suitable initial electron density. When a sufficient electron density is generated a very fast distributed discharge occurs between the main electrodes 54.1 and 54.2. As the dynamic resistance between the two main electrodes 54.1 and 54.2 is much less than that between the trigger electrodes 58.1 and 58.2, the discharge between the trigger electrodes 58.1 and 58.2 decreases substantially in magnitude, resulting in minimal erosion of the trigger electrodes 58.1 and 58.2. Further, as a substantial portion of the current flowing in the trigger discharge is transferred to the main discharge, very fast swiching occurs.

We claim:

1. A high voltage electric switch which includes:
a housing defining a chamber and adapted to contain an electrically insulating gas;
two spaced-apart main electrodes housed within the chamber, and defining between them a breakdown gap;
connecting means for connecting the electrodes in an electrical circuit, and
trigger means in close proximity to the gap, and comprising two trigger electrodes, each being directly electrically connected to different ones of the main electrodes, the geometry of the electrodes being such that the breakdown voltage between the trigger electrodes is less than the breakdown voltage between the main electrodes,
the trigger means being adapted to generate electrically electromagnetic radiation which irradiates a substantial portion of the insulating gas in the breakdown gap, the radiation being of a sufficiently high intensity to cause substantial photoelectric emission of electrons in the gas and thus breakdown of the gas and an electrical discharge between the main electrodes.

2. A high voltage switch as claimed in claim 1, which includes a radiation enhancing member disposed such that the trigger discharge occurs across a surface of the radiation enhancing member, the radiation enhancing member being of a suitable material to increase the intensity of the radiation generated by the trigger discharge.

3. A high voltage as claimed in claim 2, in which the radiation enhancing member is of a ceramic material.

4. A high voltage switch as claimed in claim 1, in which the main electrodes have a uniform surface geometry such that a uniform, static electric field is developed between them.

5. A high voltage switch as claimed in claim 1, in which the main electrodes have an extended discharge surface.

6. A high voltage switch as claimed in claim 1, in which the electrically insulating gas has a high dielectric coefficient.

7. A high voltage switch as claimed in claim 1, in which the pressure of the gas in the chamber is greater than atmospheric pressure.

8. A high voltage switch as claimed in claim 1, in which suitable additives are admixed with the gas to assist in the photo-electric emission of electrons.

9. A high voltage switch as claimed in claim 1, in which the gap separation of the main electrodes is minimal, as determined by a predetermined hold-off voltage required of the switch.

10. A high voltage switch as claimed in claim 1, in which the housing has an inlet opening wherethrough the gas may be introduced into the chamber.

* * * * *